United States Patent
Manadhata et al.

(10) Patent No.: US 8,214,365 B1
(45) Date of Patent: Jul. 3, 2012

(54) MEASURING CONFIDENCE OF FILE CLUSTERING AND CLUSTERING BASED FILE CLASSIFICATION

(75) Inventors: Pratyusa Kumar Manadhata, Piscataway, NJ (US); Sandeep B. Bhatkar, Los Angeles, CA (US); Kent E. Griffin, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 31 days.

(21) Appl. No.: 13/036,864

(22) Filed: Feb. 28, 2011

(51) Int. Cl.
 *G06F 7/00* (2006.01)
(52) U.S. Cl. ........................................... 707/737
(58) Field of Classification Search .................. 707/758, 707/737, 738, 739, 749, 750; 706/54
See application file for complete search history.

(56) References Cited

U.S. PATENT DOCUMENTS

| | | | |
|---|---|---|---|
| 7,428,541 B2 * | 9/2008 | Houle | 1/1 |
| 2009/0006378 A1 * | 1/2009 | Houle | 707/5 |
| 2009/0043797 A1 * | 2/2009 | Dorie et al. | 707/101 |
| 2011/0282828 A1 * | 11/2011 | Precup et al. | 706/54 |

* cited by examiner

*Primary Examiner* — Hung T Vy
(74) *Attorney, Agent, or Firm* — Brill Law Office; Jeffrey Brill

(57) ABSTRACT

A uniformity of a cluster of samples is determined, and a corresponding raw confidence value is calculated. A confidence interval weight is calculated using a confidence interval to determine reliability of the uniformity. A trace length weight is calculated, as a function of traces of the samples. An n-gram weight is calculated, as a function of numbers of n-grams generated by the samples. A compactness weight is calculated, as a function of the similarity of the samples. A cluster weight is calculated as a function of the four above-described weights. A cluster confidence measurement is calculated as a function of the cluster weight and the raw confidence value. When a new sample is assigned to the cluster, an assignment confidence measurement is calculated, as a function of the cluster's confidence measurement and the sample's trace length, n-grams and similarity.

20 Claims, 5 Drawing Sheets

MEASURING CONFIDENCE OF FILE CLUSTERING AND CLUSTERING BASED FILE CLASSIFICATION

TECHNICAL FIELD

This disclosure pertains generally to computer security, and more specifically to measuring the confidence of file clustering and clustering based file classification.

BACKGROUND

The clustering of executable files into sets can be used for file classification. For example, clustering can be used to classify files as malware or goodware. To do so, in a training phase, a set (cluster) of files known to comprise malware is labeled accordingly, as is a set (cluster) of files known to comprise goodware. Files of unknown status (samples) can then be classified as belonging to one cluster or another based on properties of the samples and the files in the clusters. This categorization can be more specific than a binary classification of a file, for example as malicious (malware) versus benign (goodware). Multiple clusters of files can be used, for example clusters of files known to belong to different families of malware, each specifically labeled per family. A family of malware typically includes different files resulting from modifications having been made to a common, parent codebase.

It can be assumed that different samples belonging to a classification or family will exhibit similar runtime behavior, and hence the similarity in runtime behavior can be used to classify a sample. Therefore, to classify a sample into a specific cluster, the runtime behavior of the sample is determined. The sample is then added to one of clusters, based on the similarity in runtime behavior to that of the members of the cluster. The appropriate label is added to the sample, according to the cluster based classification of the sample. In this context, a label comprises an indicator of the classification of the sample (e.g., malware, goodware, malware of a specific family, etc.). In other words, the sample is assigned to a cluster such that the sample's behavior matches most closely with the other samples in the cluster.

All training clusters, however, are not created equal. For example, if a cluster, C1, contains all malware samples and another cluster, C2, contains half malware and half goodware samples, then C1 is of better quality than C2. Moreover, all cluster based classifications of unknown samples are not equally reliable. For example, if a first sample, S1, is assigned to a better quality cluster than a second sample, S2, then the classification of S1 is typically more reliable than that of S2.

It would be desirable to address these issues.

SUMMARY

A clustering confidence management system quantifies a confidence level in the quality of a cluster of samples which are clustered according to runtime behavior. A uniformity of the cluster is determined as a function of the ratio of the most frequently occurring unique sample label present in the cluster to the total number of unique sample labels present in the cluster. In some embodiments, determining the cluster uniformity further comprises reading the label of each sample in the cluster, determining the total number of unique sample labels that are present in the cluster, determining the most frequently occurring unique sample label present in the cluster and determining the number of samples in the cluster with the most frequently occurring unique sample label. In some embodiments, the uniformity of the cluster is further determined as a function of the percentages of the total number of unique sample labels, or of the total number of samples, comprised by multiple unique sample labels present in the cluster. A raw confidence value is assigned to the cluster, the raw confidence value being a function of the determined uniformity of the cluster. In some embodiments, the raw confidence value is equal to the determined uniformity of the cluster, whereas in other embodiments more complicated functions are used, such as calculating the raw confidence value by using a sigmoid function to map the determined uniformity of the cluster to a nonlinear scale.

A confidence interval weight for the cluster is calculated by using a confidence interval (for example, a standard adjusted Wald confidence interval) to determine the reliability of the determined uniformity of the cluster. A trace length weight for the cluster is calculated, as a function of the lengths of traces generated by the samples in the cluster. In some embodiments, the trace length weight is calculated as a function of an average of the lengths of the traces generated by the samples in the cluster. In some embodiments, the trace length weight is calculated as a function of the lengths of traces into security sensitive calls made by the samples in the cluster. Additionally, an n-gram weight for the cluster is calculated, as a function of the numbers of unique n-grams generated by the samples in the cluster. In some embodiments, the n-gram weight is calculated as a function of the numbers of unique n-grams generated by the samples in the cluster making security sensitive calls. Finally, a compactness weight for the cluster is calculated, as a function of the similarity of the samples in the cluster to a point of reference. In some embodiments, the compactness weight is calculated as a function of the similarity of each sample in the cluster at a feature vector level to a prototype sample.

Once the four above-described weights for the cluster are calculated, a cluster weight for the cluster is calculated as a function of the confidence interval weight, the trace length weight, the n-gram weight and the compactness weight. In some embodiments, calculating the cluster weight comprises adding the confidence interval weight, the trace length weight, the n-gram weight and the compactness weight. In some embodiments, one or more of these weights are themselves weighted according to at least one weighting factor, prior to being added. A cluster confidence measurement is assigned to the cluster. The cluster confidence measurement is calculated as a function of the cluster weight and the cluster raw confidence value. In some embodiments, calculating the cluster confidence measurement comprises multiplying the cluster weight and the cluster raw confidence value, whereas in other embodiments more complicated functions are used.

New samples can be assigned to the cluster, based on their runtime behavior. When a new sample is assigned to the cluster, an assignment confidence measurement concerning the assignment of the new sample to the cluster is calculated, as a function of the confidence measurement assigned to the cluster, a length of the trace generated by the new sample, the number of n-grams present in the trace generated by the new sample, and a similarity of the new sample at a feature vector level to a reference point concerning the cluster.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
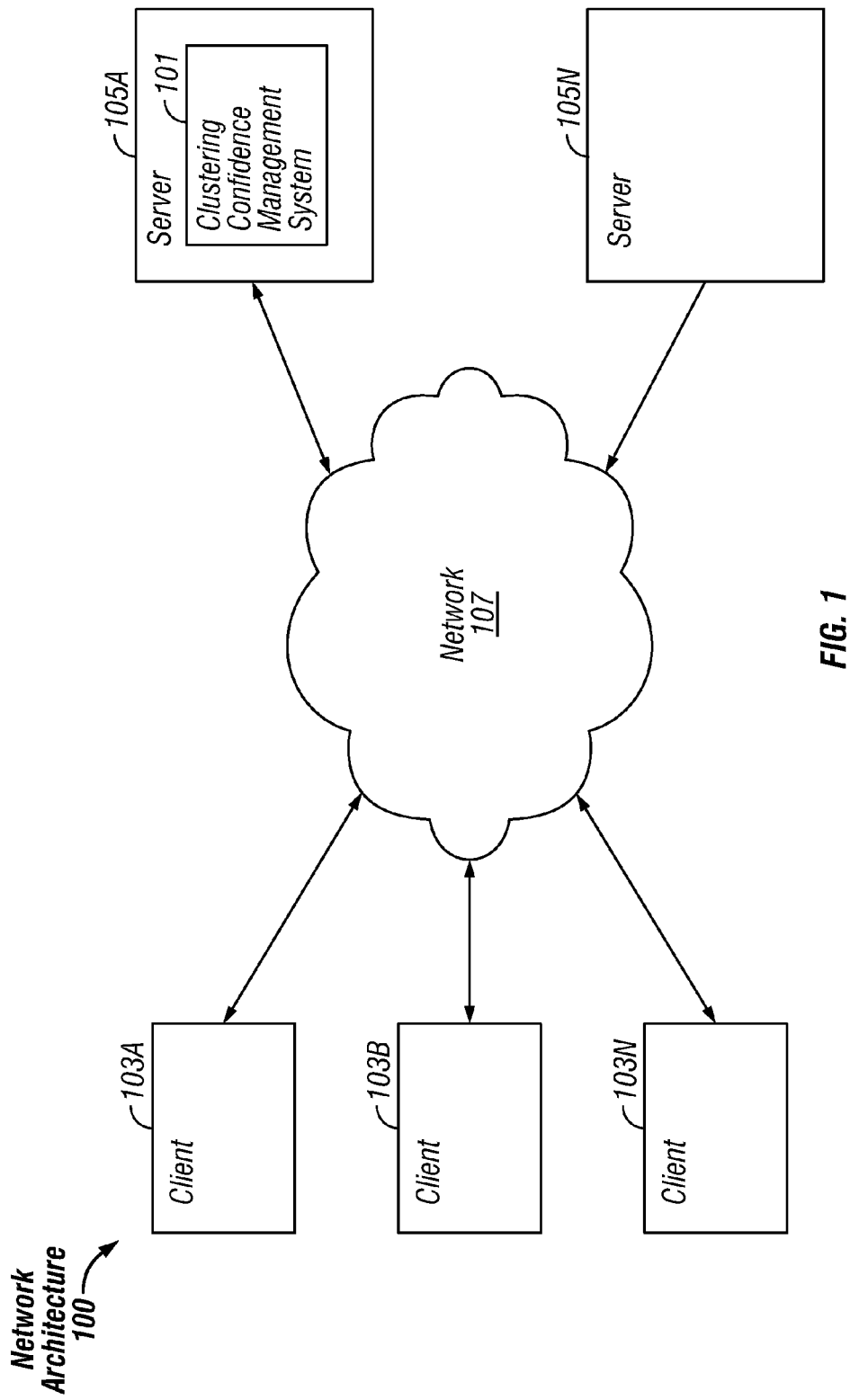
FIG. 1 is a block diagram of an exemplary network architecture in which a clustering confidence management system can be implemented, according to some embodiments.

FIG. 1 is a block diagram illustrating an exemplary network architecture 100 in which a clustering confidence management system 101 can be implemented. The illustrated network architecture 100 comprises multiple clients 103A, 103B and 103N, as well as multiple servers 105A and 105N. In FIG. 1, the clustering confidence management system 101 is illustrated as residing on server 105A. It is to be understood that this is an example only, and in various embodiments various functionalities of this system 101 can be instantiated on a client 103, a server 105 or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applicants and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
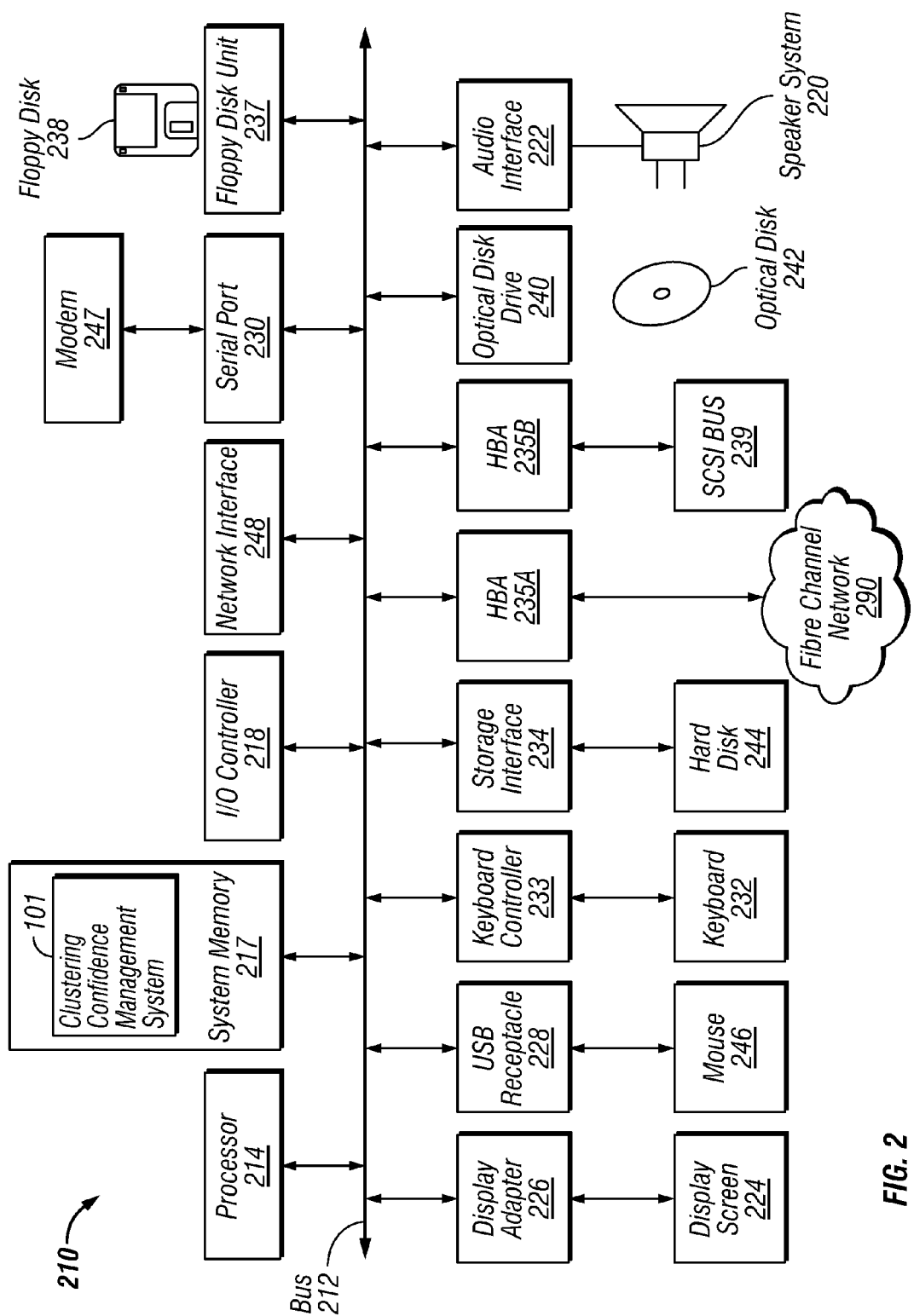
FIG. 2 is a block diagram of a computer system suitable for implementing a clustering confidence management system, according to some embodiments.

FIG. 2 is a block diagram of a computer system 210 suitable for implementing a clustering confidence management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the clustering confidence management system 101 is illustrated as residing in system memory 217. The workings of the clustering confidence management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
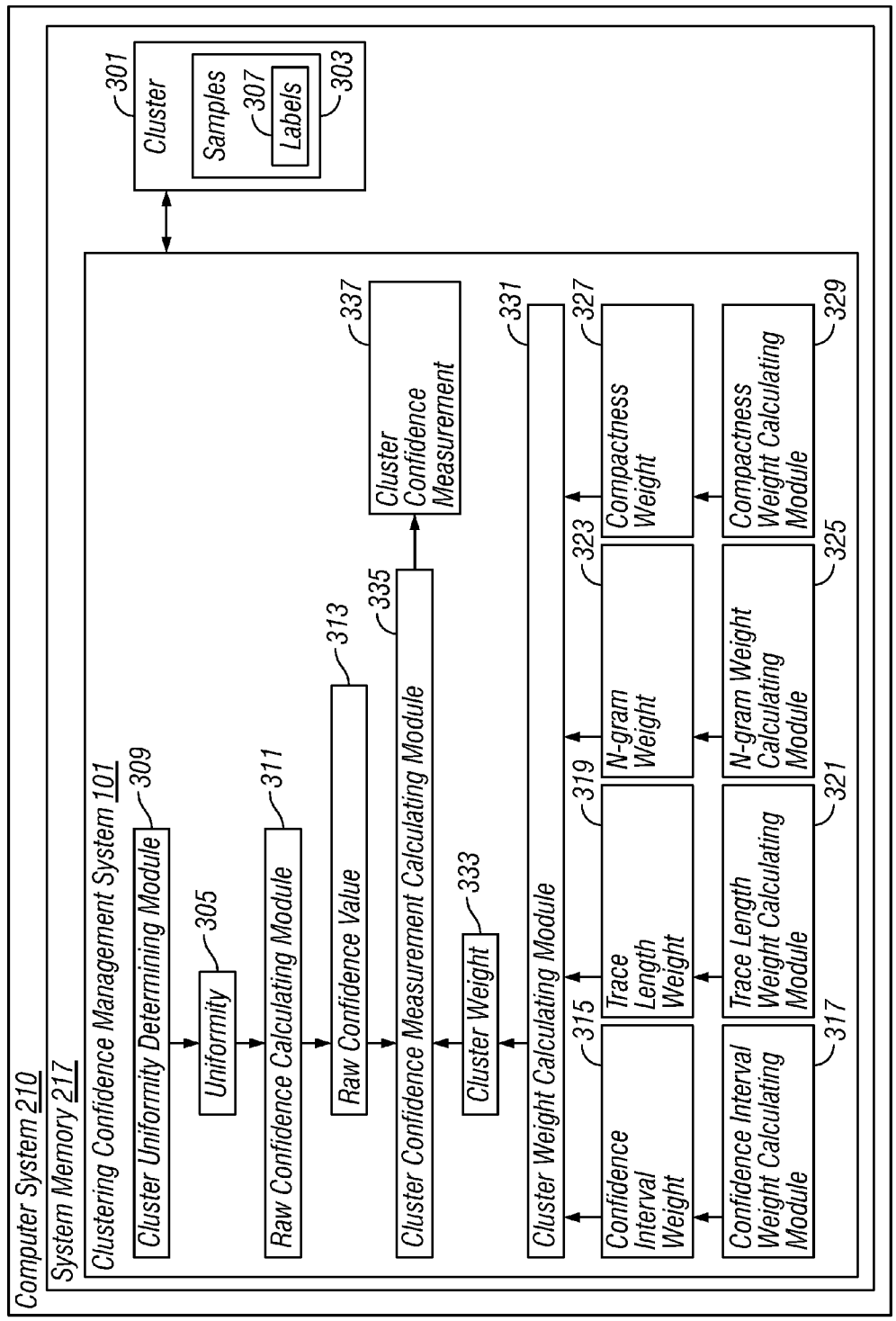
FIG. 3 is a block diagram of a clustering confidence management system calculating a confidence measurement of a cluster, according to some embodiments.

FIG. 3 illustrates the operation of a clustering confidence management system 101 residing in the system memory 217 of a computer 210, according to some embodiments. As described above, the functionalities of the clustering confidence management system 101 can reside on a client 103, a server 105, or be distributed between multiple computer systems 210, including within a cloud-based computing environment in which the functionality of the clustering confidence management system 101 is provided as a service over a network 107. It is to be understood that although the clustering confidence management system 101 is illustrated in FIG. 3 as a single entity, the illustrated clustering confidence management system 101 represents a collection of functionalities, which can be instantiated as a single or multiple modules as desired (an instantiation of specific, multiple modules of the clustering confidence management system 101 is illustrated in FIG. 3). It is to be understood that the modules of the clustering confidence management system 101 can be instantiated (for example as object code or executable images)

within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the clustering confidence management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, the clustering confidence management system 101 quantifies the confidence in the quality of a cluster 301. One parameter used in quantifying the quality of a cluster 301 is the cluster's uniformity 305. If every sample 303 in a cluster 301 has the same label 307 (e.g., all the samples 303 in the cluster 301 are labeled as being malware of a single family or all the samples 303 are labeled as being goodware), the cluster 301 is entirely uniform, and hence of a high quality. On the other hand, if different samples 303 in a cluster 301 have different labels 307 (e.g., some malware and some goodware), the cluster 301 has a lower uniformity 305, and hence is of a lower quality.

A cluster uniformity determining module 309 of the clustering confidence management system 101 determines the uniformity 305 of a cluster 301. To do so, the cluster uniformity determining module 309 reads the labels 307 of the samples 303 therein, and determines how many different labels 307 are present. The cluster uniformity determining module 309 identifies the most frequently occurring unique label 307 in the cluster 301 (the majority label), and determines what percentage it comprises of the total number of unique labels 307 present in the cluster 301. In some embodiments, it is determined, for each unique label present, what percentage of the total samples 303 in the cluster 301 have that label 307, and/or what percentage that label 307 comprises of the total number of unique labels 307 present in the cluster 301. The cluster uniformity determining module 309 assigns a uniformity 305 to the cluster 301 in the form of a quantified value calculated as a function of the total number of different labels 307 present in the cluster 301, and the percentage comprised by at least the majority label of the total number of unique labels 307. Where every sample 303 in the cluster 301 has the same label 307 (i.e., a single label 307 accounts for 100% of the samples 301 in the cluster 303), that cluster 301 has the highest possible uniformity 305. Clusters 301 with progressively more diversity have lower uniformity 305. For a cluster 301 of samples 303 having different labels 307, the lowest possibility uniformity 305 occurs when the cluster has an equal distribution of the number of different labels 307 present in the cluster 301.

For example, in a cluster 301 in which each sample 303 has one of two possible labels 307 (e.g., malware or goodware) and 50% of the samples 303 are of each possibility, that cluster 301 has the lowest possible uniformity 305 for a cluster 301 containing two different labels 307. The lowest possible uniformity 305 for a cluster 301 of samples 303 having three different labels 307 (e.g., goodware and two separate families of malware) occurs when one third of the samples 303 are of each different label 307 present in the cluster 301 (e.g., one third malware family A, one third malware family B, one third goodware). Additionally, the more different labels 307 that are present in the cluster 301, the lower the uniformity 305 of the cluster 301. For example, all else being equal, a cluster 301 containing samples 303 with three different labels 307 would be less uniform than one containing samples 303 with two different labels 307.

The cluster uniformity determining module 309 quantifies the uniformity 307 of the cluster 301 as a function of the number of different labels 307 in the cluster 301, and percentages of samples 303 in the cluster 301 having given labels 307. In one embodiment, the uniformity 305 is calculated as the fraction of the majority label in the cluster 301 over the total number of unique labels occurring therein. Formally, this can be expressed as U=ML/T, where U is the uniformity, ML is the number of samples 303 having the majority label 307 and T is the total number of samples 303 in the cluster 301. Under this quantification, the highest possible uniformity 305 is one, meaning that every sample 303 in the cluster 301 has the same label 307. The lowest possible uniformity 305 for a cluster having samples 303 with N different labels 307 is 1/N, representing an equal distribution of samples 303 with each possible N. Under this quantification scenario, the uniformity 305 is represented by a number from 1 to 1/N, where N equals the number of different labels 307 present in the cluster 301, and a higher number means that the cluster 301 is more uniform. For example, in a cluster 301 containing samples with two different labels 307, an equal distribution of the labeled samples would result in a uniformity of ½ (0.5), the lowest possible value for a cluster 301 with two different labels 307. In other embodiments, the cluster uniformity determining module 309 can employ variations in the quantification of the uniformity 305 (e.g., use a higher or lower weight representing the number of unique labels 307 present, convert the value into a three digit positive number, calculate the uniformity 305 as a percentage comprised by each unique label 307 of the total number of unique labels 307 or of all the samples 303, etc.).

The uniformity 305 can be thought of as the raw confidence in the quality of the cluster 301. The quantified uniformity 305 is thus used to calculate a raw confidence value 313 which is assigned to the cluster 301. The raw confidence value 313 is subsequently weighted according to multiple factors as described below. A raw confidence calculating module 311 of the clustering confidence management system 101 calculates the raw confidence value 313 of the cluster 301 as a function of the cluster's uniformity 305. The specific function used to calculate the raw confidence value 313 of a cluster 301 varies between embodiments. In one embodiment, the uniformity 305 itself is used as the raw confidence value 313 of the cluster 301. In other embodiments, more complicated functions are used, for example scaling the uniformity 305 nonlinearly to compute the raw confidence value 313. For example, in one embodiment a sigmoid function is used to map the uniformity 305 to a nonlinear scale in the range [0,1]. Formally, this is: RC=Sigmoid(U), where RC equals raw confidence value 313 and U equals uniformity 305.

Once calculated, the raw confidence value 313 of the cluster 301 is weighted using four different weighting factors: a confidence interval weight 315, a trace length weight 319, an n-gram weight 323 and a compactness weight 327. These four different weights are described in turn.

The confidence interval weight 315 is based on a confidence interval concerning the reliability of the uniformity 305, taking into account the size of the cluster 301. The value of the uniformity 305 being equal, the larger the size of the cluster 301, the more reliable that uniformity 305 is as a measure of cluster 301 quality. For example, the uniformity 305 of a two label 307 cluster 301 in which X of Y (e.g., ⅗)

samples 303 have a given label 307 is the same as the uniformity 305 for a cluster 301 in which this is so for 10X of 10Y samples 303 (e.g., 3⁄50), because the underlying fraction has the same numeric value. However, the cluster 301 with fifty samples 303 is more reliable than the cluster 301 with five samples 301, despite the fact that the percentage of majority labels 307 is the same in both cases.

To take this factor into account, a confidence interval weight calculating module 317 of the clustering confidence management system 101 calculates a confidence interval weight 315. First, a confidence interval is determined and used to estimate the reliability of the uniformity 305. More specifically, a binomial (or polynomial) proportion confidence interval is used to estimate the reliability of the proportion (of labels 307 of a given value) underlying the uniformity 305, given the size of the cluster 301. In one embodiment, a standard adjusted Wald confidence interval (normal approximation interval) is used. In other embodiments, other confidence interval types are used (e.g., Wilson score interval, Clopper-Pearson interval, Agresti-Coull interval, etc.). In an embodiment in which a Wald type interval is used, the value of the interval is in the range [0,0.5] (for a cluster 301 with two different labels 307), with 0 indicating maximum reliability and 0.5 indicating minimum reliability. The confidence interval weight calculating module 317 converts the size of the confidence interval into a confidence interval weight 315, CIW. For example, this can be calculated formally as CIW=1-2*confidence interval size, in the range [0,1]. In other embodiments, the formal calculation of the confidence interval weight 315 based on the parameters discussed above can vary.

The next weighing factor is the trace length weight 319, which is determined as a function of the lengths of traces through system calls (e.g., calls made to the operating system through its Application Programming Interface, or "API") generated while running the samples 303 in the cluster 301. More specifically, in order to determine the runtime behavior of a sample 303 in the context of clustering, the sample 301 is run and its execution is monitored. When the running sample 301 makes system calls of interest, the corresponding execution is traced. Such a trace is of a specific length. The longer the traces generated by a sample 303, the more data there is concerning the runtime behavior of the sample 303, and hence the higher the level of confidence in the clustering of the sample 303. Thus, all else being equal, a cluster 301 of samples 303 that generated longer traces is of higher quality than one of samples 303 that generated shorter traces.

In some embodiments, if a trace length is equal to or greater than a threshold, the trace is considered to be of maximum reliability. In other words, although longer traces are generally considered more reliable, after a certain threshold trace length, the reliability is no longer considered to increase with additional length. In embodiments in which a trace length threshold is used, the specific value to use is a variable design parameter, which is typically determined empirically.

The specific system calls made by executing samples 303 that are considered to be of interest and thus traced varies depending upon the operating system under which the samples 303 are running, as well as the basis on which the samples 303 are being clustered. For example, where samples 303 are being clustered as malware versus goodware, or according to malware family, the system calls of interest are security sensitive operations, such as creating or writing files, accessing the network, starting new processes, changing system security settings, etc. More, fewer and/or different calls can be considered of interest in different embodiments. In some embodiments, calls of interest are not limited to system calls, but can include other API calls as well (e.g., calls made to a specific application program, library, etc.).

In order to calculate the trace length weight 319 for a cluster, a trace length weight calculating module 321 of the clustering confidence management system 101 monitors the lengths of the traces of interest generated by the samples 303 in the cluster 301. The exact protocol for calculating the trace length weight 319 based on the lengths of the multiple traces varies between embodiments. Typically an average or weighted average of the trace lengths of interest generated by the multiple samples 303 in the cluster 301 is calculated. The trace length weight 319 is then calculated as a function of the average trace length. For example, in an embodiment in which a maximum length threshold is employed, the trace length weight 319, TLW, can be calculated as TLW=min(1, average trace length/threshold), in the range [0,1]. In other embodiments, the formal calculation of the trace length weight 319 based on the parameters discussed above can vary.

The next weighting factor is the n-gram weight 323. The n-gram weight 323 is a function of the number of unique n-grams generated when the samples 303 in the cluster 301 are run to determine their runtime behaviors. An n-gram in this context is a specific sequence of n calls made by an executing sample 303. N-grams are used to determine the similarity between the runtime behavior of samples 303. When samples 303 have one or more n-grams in common, this is an indication that the samples 303 have similar runtime behavior. In general, the more distinct n-grams present in a trace generated by running a sample 303, the greater the indication that the sample is similar to other samples 303 that generated the same distinct n-grams, and thus the higher the confidence in the classification of the sample 303 into the cluster 301. Thus, a cluster 301 with samples 303 that generated more n-grams is of a higher quality, all else being equal.

As with the length of traces, in some embodiments if the number of n-grams in a trace is equal to or greater than a threshold, the number of n-grams is considered to indicate a maximum reliability. Although more n-grams are generally considered more reliable, after a certain threshold of n-grams is reached, the reliability is no longer considered to increase with additional n-grams. In embodiments in which an n-gram threshold is used, the specific value to use for the threshold is a variable design parameter, which is typically determined empirically.

An n-gram weight calculating module 325 of the clustering confidence management system 101 computes the average (or a weighted average) number of n-grams for the samples 303 of the cluster 301. The n-gram weight calculating module 323 uses this average to calculate the n-gram weight 323 for the cluster 301. The exact protocol for calculating the n-gram weight 323 based on the number of n-grams in the samples 303 of the cluster varies between embodiments. For example, in an embodiment in which an n-gram threshold is employed, the n-gram weight 323, NGW, can be calculated as NGW=min(1, average n-gram number/threshold), in the range [0,1].

The final weighting factor is the compactness weight 327. This is a function of how "compact" the cluster 301 is, meaning how close the samples 303 of the cluster 301 are to each other. In general, when classifying samples 303 into clusters 301 based on their runtime behavior, the samples are run and analyzed, and a feature vector is created for each sample 303 measuring a plurality of characteristics indicative of the runtime behavior of the sample 303. In this context, the distance between two samples 303 means the overall distinction between the samples 303 at a feature vector level. The less the distance between samples 303 (i.e., the closer the samples 301 are) in a cluster 301, the better the cluster's quality.

In general, a cluster's compactness can be computed using a single reference point, such as the cluster's centroid, or multiple cluster representative samples 303, called prototypes. In some embodiments, a compactness weight calculating module 329 of the clustering confidence management system 101 calculates the compactness of a cluster 301 by determining the distance between each sample 303 of the cluster and its nearest prototype sample. The compactness weight calculating module 329 then calculates the average distance. In other embodiments, the cluster's compactness is calculated by computing the average distance of the samples 303 of the cluster 301 from the cluster's centroid, which is representative of the samples 303 in the cluster 301.

As described above concerning some of the others of the weighting factors, in some embodiments a distance threshold is used. In such embodiments, a sample 303 is considered to have the maximum closeness if the sample's distance is less than or equal to an empirically chosen distance threshold. The specific value to use for the distance threshold is a variable design parameter.

The compactness weight calculating module 329 determines the distance of each sample 303 in the cluster 301 from its nearest prototype sample. The average distance is then calculated, and used to calculate the compactness weight 323 for the cluster 301. The exact protocol for calculating the compactness weight 323 based on the closeness of the samples 303 of the cluster varies between embodiments. For example, in an embodiment in which a distance weight is employed, the compactness weight 323, CW, can be calculated as CW=min(1, threshold/average distance), in the range [0,1].

A cluster weight calculating module 331 of the clustering confidence management system 101 calculates a cluster weight 333 based on the four weighting factors: the confidence interval weight 315, the trace length weight 319, the n-gram weight 323 and the compactness weight 327. In different embodiment, the cluster weight 333 can be calculated as a function of the four weighting factors in different ways. For example, in one embodiment a weighted linear combination of the weighting factors is used, as follows: W=0.1*CIW+0.4*TLW+0.3*NGW+0.2*CW, where W is the cluster weight 333, CIW is the confidence interval weight 315, TLW is the trace length weight 319, NGW is the n-gram weight 323 and CW is the compactness weight 327, wherein W is in the range [0,1]. In the calculating of the cluster weight 333, other weights can be applied to the different weighting factors than those in the equation above. In other embodiments, non-linear combinations of the weighting factors are used to calculate the cluster weight 333.

In any case, once the cluster weight 333 has been calculated, a cluster confidence measurement calculating module 335 of the clustering confidence management system 101 calculates a cluster confidence measurement 337 which is assigned to the cluster 301. The cluster confidence measurement 337 is based on the raw confidence value 313 of the cluster 301 and the cluster weight 333. The cluster confidence measurement 337 can be calculated by multiplying the cluster weight 333 and the raw confidence value 313, or by applying a more complicated function. In some embodiments, the cluster confidence measurement 337 is in the form of a numerical value. In some embodiments, the cluster confidence measurement 337 can be in the form of one of a group of discrete levels, based on (variably definable) thresholds (e.g., low, medium, and high).

Figure 4:
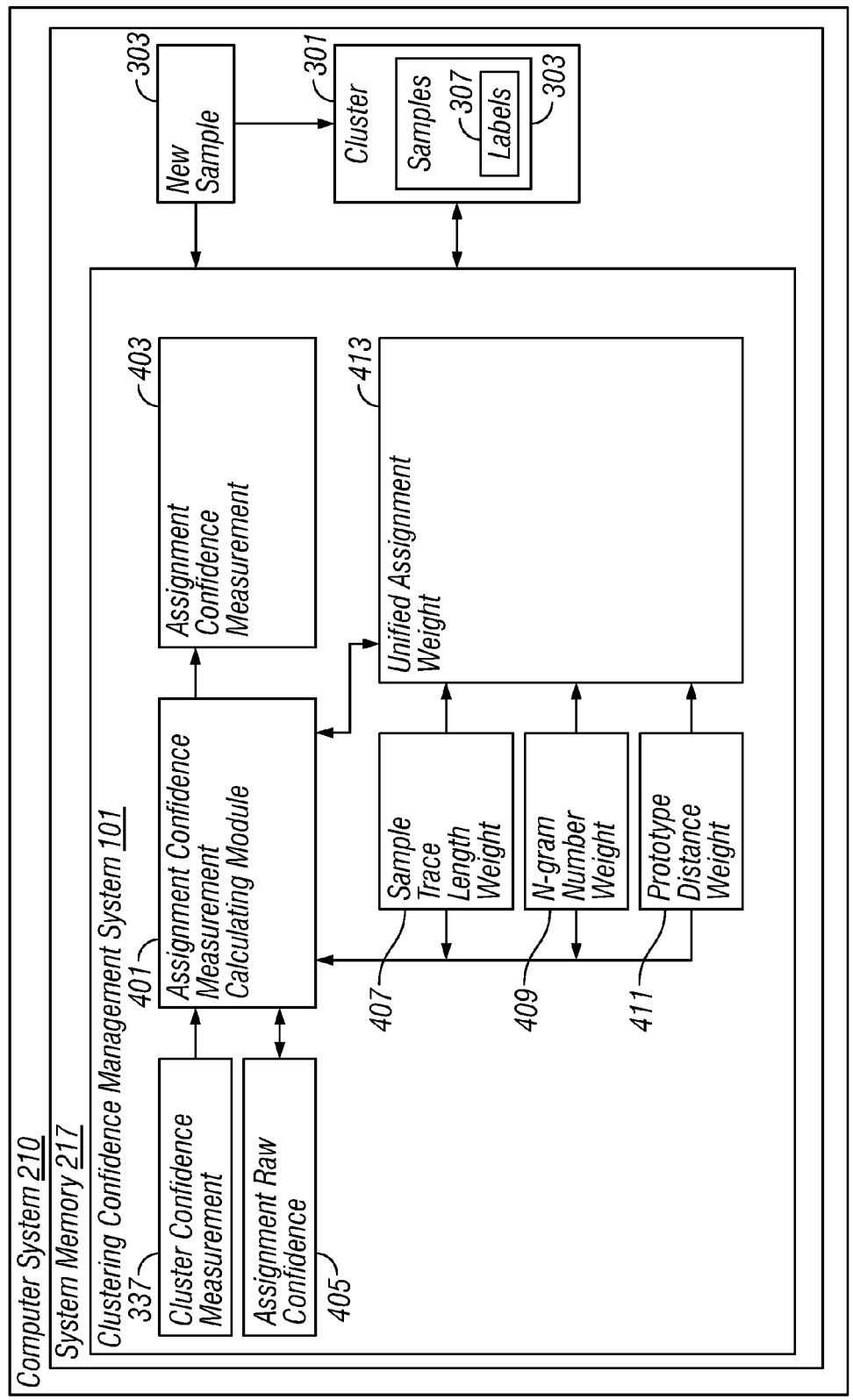
FIG. 4 is a block diagram of a clustering confidence management system calculating a confidence measurement of an assignment of a sample to a cluster, according to some embodiments.

Turning now to FIG. 4, once a cluster confidence measurement 337 exists for a cluster 301, the confidence in assignments of individual samples 303 to the cluster 301 based on their runtime behavior can be quantified. To this end, when a sample 303 is assigned to a cluster 301 based on the sample's runtime behavior, an assignment confidence measurement calculating module 401 of the clustering confidence management system 101 calculates an assignment confidence measurement 403 based on four parameters: the cluster confidence measurement 337, the length of the trace generated by the sample 303 being assigned to the cluster 301, the number of n-grams present in the trace generated by the sample 303, and the sample's distance from a reference point such as the nearest prototype sample for the cluster 301. The cluster confidence measurement 337 is germane to the calculation of the assignment confidence measurement 403, because it reflects the quality of the cluster 301 to which the sample is being assigned. The sample's trace length and number of n-grams are relevant, because they are indicative of the quantity of data concerning the sample's runtime behavior used in assigning the sample 303 to the cluster 301. Finally, the distance between the sample 301 and the prototype is relevant because it reflects both a quantitative and qualitative measurement of the similarity between the runtime behavior of the sample 301 being assigned to the cluster 301 and that of the existing members of the cluster 301.

The specific protocol for generating the assignment confidence measurement 403 as a function of the four parameters described above varies between embodiments. In one embodiment, the assignment confidence measurement calculating module 401 treats the cluster's confidence measurement 337 as an indicator of the raw confidence 405 in the assignment of the sample 303 to the cluster 301. In some embodiments the value of the cluster confidence measurement, CC, can simply be assigned as a raw confidence value, RC, of the classification. In other embodiments, more complicated linear or non linear functions of the form RC=F(CC) can be used, where F is a function defined as a variable design choice which can differ between embodiments.

To take into account the parameters concerning the sample 303 itself and its runtime behavior, the assignment confidence measurement calculating module 401 can convert the sample's trace length, TL, into a trace length weight 407 (TLW). For example, the trace length weight 407 can be calculated as TLW=min(1, TL/threshold), in the range [0,1]. Similarly, the assignment confidence measurement calculating module 401 can convert the sample's number of n-grams, NN, into an n-gram number weight 409 (NNW), for example as NNW=min(1, NN/Threshold), in the range [0,1]. Additionally, the sample's distance from the prototype, PD, is used to calculate a prototype distance weight 411 (PDW), for example as PDW=min(1, Threshold/PD), in the range [0,1]. As with the calculating of the cluster weighting factors described above in conjunction with FIG. 3, the exact protocols used for calculating the assignment weights based on the above-described parameters varies between embodiments. For example, the formulas above contain the use of a threshold in the calculation of all three assignment weights, but in some embodiments a threshold is not used in one or more of these calculations.

The assignment confidence measurement calculating module 401 calculates a unified assignment weight 413, USW, as a function of the three assignment weights discussed above. This can be in the form USW=F(TLW, NNW, PDW), in the range [0,1], where F is a function which can be defined as a variable design choice. Both linear and non-linear combinations of the three assignment weights can be used to calculate the unified assignment weight 413.

Once a unified assignment weight 413 has been calculated, the assignment confidence measurement calculating module 401 calculates the assignment confidence measurement 403 as a function of the assignment raw confidence value 405 and the unified assignment weight 413 (e.g., as the product of multiplying the assignment raw confidence value 405 and the unified assignment weight 413, or as a more complicated function of the two parameters).

Figure 5:
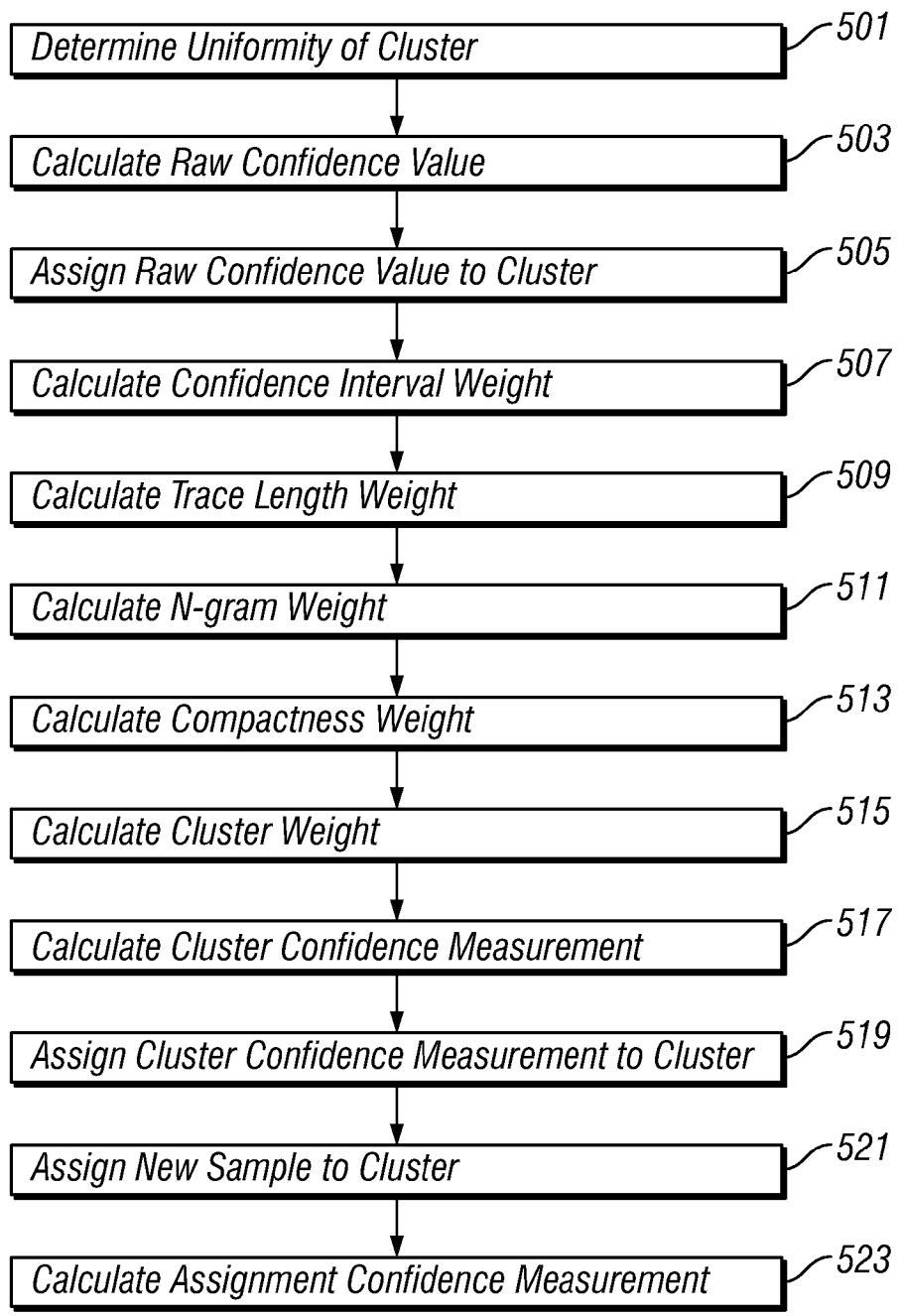
FIG. 5 is a flowchart of the operation of a clustering confidence management system, according to some embodiments.

FIG. 5 illustrates steps of the operation of the clustering confidence management system 101 (FIG. 1), according to some embodiments. The cluster uniformity determining module 309 (FIG. 3) determines 501 the uniformity 305 (FIG. 3) of the cluster 301 (FIG. 3), as a function of at least the ratio of the most frequently occurring unique sample label 307 (FIG. 3) present in the cluster 301 (FIG. 3) to the total number of unique sample labels 307 (FIG. 3) present in the cluster 301 (FIG. 3). The raw confidence calculating module 311 (FIG. 3) calculates 503 the raw confidence value 313 (FIG. 3) as a function of the cluster's uniformity 305 (FIG. 3), and assigns 505 the raw confidence value 313 (FIG. 3) to the cluster 301 (FIG. 3). The confidence interval weight calculating module 317 (FIG. 3) calculates 507 the confidence interval weight 315 (FIG. 3) for the cluster 301 (FIG. 3), by using a confidence interval to determine the reliability of the cluster's determined uniformity 305 (FIG. 3). The trace length weight calculating module 321 (FIG. 3) calculates 509 the trace length weight 319 (FIG. 3) for the cluster 301 (FIG. 3), as a function of the lengths of the traces generated by the samples 303 (FIG. 3) in the cluster 301 (FIG. 3). The n-gram weight calculating module 325 (FIG. 3) calculates 511 the n-gram weight 323 (FIG. 3) for the cluster 301 (FIG. 3), as a function of the numbers of unique n-grams generated by the samples 303 (FIG. 3) in the cluster 301 (FIG. 3). The compactness weight calculating module 329 (FIG. 3) calculates 513 the compactness weight 327 (FIG. 3) for the cluster 301 (FIG. 3), as a function of the similarity of the samples 303 (FIG. 3) in the cluster 301 (FIG. 3) to a point of reference. The cluster weight calculating module 331 (FIG. 3) calculates 515 the cluster weight 333 (FIG. 3), as a function of the confidence interval weight 315 (FIG. 3), the trace length weight 319 (FIG. 3), the n-gram weight 323 (FIG. 3) and the compactness weight 327 (FIG. 3). The cluster confidence measurement calculating module 335 (FIG. 3) calculates 517 the cluster confidence measurement 337 (FIG. 3), as a function of the raw confidence value 313 (FIG. 3) of the cluster 301 and the cluster weight 333 (FIG. 3), and assigns 519 the cluster confidence measurement 337 (FIG. 3) to the cluster 301 (FIG. 3). A new sample 303 (FIG. 3) is assigned 521 to the cluster 301 (FIG. 3), based on the sample's runtime behavior. The assignment confidence measurement calculating module 401 (FIG. 4) calculates 523 the assignment confidence measurement 403 (FIG. 4) concerning the assignment of the new sample 303 (FIG. 3) to the cluster 301 (FIG. 3), as a function of the confidence measurement 337 (FIG. 3) assigned to the cluster 301 (FIG. 3), a length of the trace generated by the new sample 303 (FIG. 3), the number of n-grams present in the trace generated by the new sample 303 (FIG. 3), and a similarity of the new sample 303 (FIG. 3) at a feature vector level to a reference point concerning the cluster 301 (FIG. 3).

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for quantifying a confidence level in a quality of a cluster of samples, wherein the samples are clustered according to runtime behavior, the method comprising the steps of:

determining, by at least one computer, a uniformity of the cluster, the uniformity of the cluster being determined as a function of at least a ratio of a most frequently occurring unique sample label present in the cluster to a total number of unique sample labels present in the cluster;

assigning, by the at least one computer, a raw confidence value to the cluster, the raw confidence value being a function of the determined uniformity of the cluster;

calculating, by the at least one computer, a confidence interval weight for the cluster, the confidence interval weight being calculated by using a confidence interval to determine reliability of the determined uniformity of the cluster;

calculating, by the at least one computer, a trace length weight for the cluster, the trace length weight being calculated as a function of lengths of traces generated by the samples in the cluster;

calculating, by the at least one computer, an n-gram weight for the cluster, the n-gram weight being calculated as a function of numbers of unique n-grams generated by the samples in the cluster;

calculating, by the at least one computer, a compactness weight for the cluster, the compactness weight being calculated as a function of similarity of samples in the cluster to a point of reference;

calculating, by the at least one computer, a cluster weight for the cluster, the cluster weight being calculated as a function of the confidence interval weight, the trace length weight, the n-gram weight and the compactness weight; and assigning, by the at least one computer, a cluster confidence measurement to the cluster, the cluster confidence measurement being a function of the cluster weight and the cluster raw confidence value.

2. The method of claim 1 wherein determining, by the at least one computer, the uniformity of the cluster further comprises:

reading, by the at least one computer, a label of each sample in the cluster;

determining, by the at least one computer, a total number of unique sample labels that are present in the cluster;

determining, by the at least one computer, the most frequently occurring unique sample label present in the cluster;

determining, by the at least one computer, a number of samples in the cluster with the most frequently occurring unique sample label present in the cluster; and determining, by the at least one computer, a percentage of the total number of unique sample labels that are present in the cluster comprised by the number of samples in the cluster with the most frequently occurring unique sample label.

3. The method of claim 1 wherein determining, by the at least one computer, the uniformity of the cluster further comprises:
reading, by the at least one computer, a label of each sample in the cluster;
determining, by the at least one computer, a total number of unique sample labels that are present in the cluster; and
for each unique sample label present in the cluster, determining, by the at least one computer, its percentage of the total number of unique sample labels that are present in the cluster; and
determining, by the at least one computer, the uniformity of the cluster as a function of percentages of the total number of unique sample labels that are present comprised by multiple unique sample labels present in the cluster.

4. The method of claim 1 wherein determining, by the at least one computer, the uniformity of the cluster further comprises:
reading, by the at least one computer, a label of each sample in the cluster;
determining, by the at least one computer, a total number of unique sample labels that are present in the cluster;
for each unique sample label present in the cluster, determining, by the at least one computer, a percentage of a total number of samples that are present in the cluster having that unique sample label; and
determining, by the at least one computer, the uniformity of the cluster as a function of percentages of the total number of samples that are present comprised by samples with each multiple unique sample label present in the cluster.

5. The method of claim 1 wherein assigning, by the at least one computer, a raw confidence value to the cluster, the raw confidence value being a function of the determined uniformity of the cluster, further comprises:
calculating, by the at least one computer, the raw confidence value by using a sigmoid function to map the determined uniformity of the cluster to a nonlinear scale.

6. The method of claim 1 wherein calculating, by the at least one computer, a confidence interval weight for the cluster further comprises:
using, by the at least one computer, a standard adjusted Wald confidence interval to determine the reliability of the determined uniformity of the cluster.

7. The method of claim 1 wherein calculating, by the at least one computer, a trace length weight for the cluster further comprises:
calculating, by the at least one computer, the trace length weight for the cluster as a function of an average of the lengths of traces generated by the samples in the cluster.

8. The method of claim 1 wherein calculating, by the at least one computer, a trace length weight for the cluster further comprises:
calculating, by the at least one computer, the trace length weight for the cluster as a function of lengths of traces into security sensitive calls made by the samples in the cluster.

9. The method of claim 1 wherein calculating, by the at least one computer, an n-gram weight for the cluster, further comprises:
calculating, by the at least one computer, the n-gram weight for the cluster as a function of numbers of unique n-grams generated by the samples in the cluster making security sensitive calls.

10. The method of claim 1 wherein calculating, by the at least one computer, a compactness weight for the cluster further comprises:
calculating, by the at least one computer, the compactness weight for the cluster as a function of a similarity of each sample in the cluster at a feature vector level to a prototype sample.

11. The method of claim 1 wherein calculating, by the at least one computer, a cluster weight for the cluster further comprises:
weighting, by the at least one computer, at least one of the interval weight, the trace length weight, the n-gram weight and the compactness weight according to at least one weighting factor; and
adding, by the at least one computer, the confidence interval weight, the trace length weight, the n-gram weight and the compactness weight.

12. The method of claim 1 wherein assigning, by the at least one computer, a cluster confidence measurement to the cluster further comprises:
calculating, by the at least one computer, the cluster confidence measurement by multiplying the cluster weight and the cluster raw confidence value.

13. The method of claim 1 further comprising:
assigning, by the at least one computer, a new sample to the cluster, based on the runtime behavior of the new sample; and
calculating, by the at least one computer, an assignment confidence measurement concerning the assignment of the new sample to the cluster as a function of the confidence measurement assigned to the cluster, a length of a trace generated by the new sample, a number of n-grams present in the trace generated by the new sample, and a similarity of the new sample at a feature vector level to a reference point concerning the cluster.

14. At least one non-transitory computer readable medium storing a computer program product for quantifying a confidence level in a quality of a cluster of samples, wherein the samples are clustered according to runtime behavior, the computer program product comprising:
program code for determining a uniformity of the cluster, the uniformity of the cluster being determined as a function of at least a ratio of a most frequently occurring unique sample label present in the cluster to a total number of unique sample labels present in the cluster;
program code for assigning a raw confidence value to the cluster, the raw confidence value being a function of the determined uniformity of the cluster;
program code for calculating a confidence interval weight for the cluster, the confidence interval weight being calculated by using a confidence interval to determine reliability of the determined uniformity of the cluster;
program code for calculating a trace length weight for the cluster, the trace length weight being calculated as a function of lengths of traces generated by the samples in the cluster;
program code for calculating an n-gram weight for the cluster, the n-gram weight being calculated as a function of numbers of unique n-grams generated by the samples in the cluster;
program code for calculating a compactness weight for the cluster, the compactness weight being calculated as a function of similarity of samples in the cluster to a point of reference;
program code for calculating a cluster weight for the cluster, the cluster weight being calculated as a function of the confidence interval weight, the trace length weight, the n-gram weight and the compactness weight; and program code for assigning a cluster confidence measurement to the cluster, the cluster confidence measurement being a function of the cluster weight and the cluster raw confidence value.

15. The computer program product of claim 14 wherein the program code for determining the uniformity of the cluster further comprises:

program code for reading a label of each sample in the cluster;

program code for determining a total number of unique sample labels that are present in the cluster;

program code for determining the most frequently occurring unique sample label present in the cluster;

program code for determining a number of samples in the cluster with the most frequently occurring unique sample label present in the cluster; and program code for determining a percentage of the total number of unique sample labels that are present in the cluster comprised by the number of samples in the cluster with the most frequently occurring unique sample label.

16. The computer program product of claim 14 wherein the program code for calculating a trace length weight for the cluster further comprises:

program code for calculating the trace length weight for the cluster as a function of lengths of traces into security sensitive calls made by the samples in the cluster.

17. The computer program product of claim 14 wherein the program code for calculating an n-gram weight for the cluster, further comprises:

program code for calculating the n-gram weight for the cluster as a function of numbers of unique n-grams generated by the samples in the cluster making security sensitive calls.

18. The computer program product of claim 14 wherein the program code for calculating a compactness weight for the cluster further comprises:

program code for calculating the compactness weight for the cluster as a function of a similarity of each sample in the cluster at a feature vector level to a prototype sample.

19. The computer program product of claim 14 further comprising:

program code for assigning a new sample to the cluster, based on the runtime behavior of the new sample; and program code for calculating an assignment confidence measurement concerning the assignment of the new sample to the cluster as a function of the confidence measurement assigned to the cluster, a length of a trace generated by the new sample, a number of n-grams present in the trace generated by the new sample, and a similarity of the new sample at a feature vector level to a reference point concerning the cluster.

20. A computer system for quantifying a confidence level in a quality of a cluster of samples, wherein the samples are clustered according to runtime behavior, the computer system comprising:

a processor;

computer memory;

a cluster uniformity determining module residing in the system memory, configured for determining a uniformity of the cluster as a function of at least the uniformity of the cluster being determined as a function of at least a ratio of a most frequently occurring unique sample label present in the cluster to a total number of unique sample labels present in the cluster;

a raw confidence calculating module residing in the system memory, configured for assigning a raw confidence value to the cluster, the raw confidence value being a function of the determined uniformity of the cluster;

a confidence interval weight calculating module residing in the system memory, configured for calculating a confidence interval weight for the cluster, the confidence interval weight being calculated by using a confidence interval to determine reliability of the determined uniformity of the cluster;

a trace length weight calculating module residing in the system memory, configured for calculating a trace length weight for the cluster, the trace length weight being calculated as a function of lengths of traces generated by the samples in the cluster;

an n-gram weight calculating module residing in the system memory, configured for calculating an n-gram weight for the cluster, the n-gram weight being calculated as a function of numbers of unique n-grams generated by the samples in the cluster;

a compactness weight calculating module residing in the system memory, configured for calculating a compactness weight for the cluster, the compactness weight being calculated as a function of similarity of samples in the cluster to a point of reference;

a cluster weight calculating module residing in the system memory, configured for calculating a cluster weight for the cluster, the cluster weight being calculated as a function of the confidence interval weight, the trace length weight, the n-gram weight and the compactness weight; and a cluster confidence measurement calculating module residing in the system memory, configured for assigning a cluster confidence measurement to the cluster, the cluster confidence measurement being a function of the cluster weight and the cluster raw confidence value.

* * * * *